Oct. 21, 1924.  1,512,674
H. A. CAMPBELL
COOKING MACHINE
Filed Nov. 21, 1923   2 Sheets-Sheet 2

INVENTOR.
HENRY A. CAMPBELL
BY Dewey Strong
Townsend & Loftus
ATTORNEYS.

Patented Oct. 21, 1924.

1,512,674

UNITED STATES PATENT OFFICE.

HENRY A. CAMPBELL, OF OAKLAND, CALIFORNIA.

COOKING MACHINE.

Application filed November 21, 1923. Serial No. 676,066.

*To all whom it may concern:*

Be it known that I, HENRY A. CAMPBELL, a citizen of the United States, residing at Oakland, county of Alameda, and State of California, have invented new and useful Improvements in a Cooking Machine, of which the following is a specification.

This invention relates to a machine for automatically cooking, baking and frying foods and other products, and it particularly relates to a modified form of a structure shown in my copending application entitled, "Universal cooking machine," filed April 9, 1923, Serial No. 630,826.

The object of the present invention is to generally simplify the construction and operation of the machine referred to in my copending application, and especially to provide a stationary type or form thereof; to provide a machine which may be efficiently operated, whether running under maximum or minimum capacity; a machine which is electrically heated; a machine wherein predetermined temperatures are automatically obtained whether cooking or standing idle; and furthermore, to provide a cooking unit which is normally closed by a cover when the cooking operation is taking place, and which is provided with means for automatically opening the cover when the cooking operation has been completed, and which will also automatically lower the temperature in the cooking unit when the cover is opened. Other objects will hereinafter appear.

One form which my invention may assume is exemplified in the following description, and illustrated in the accompanying drawings, in which—

Figure 1:
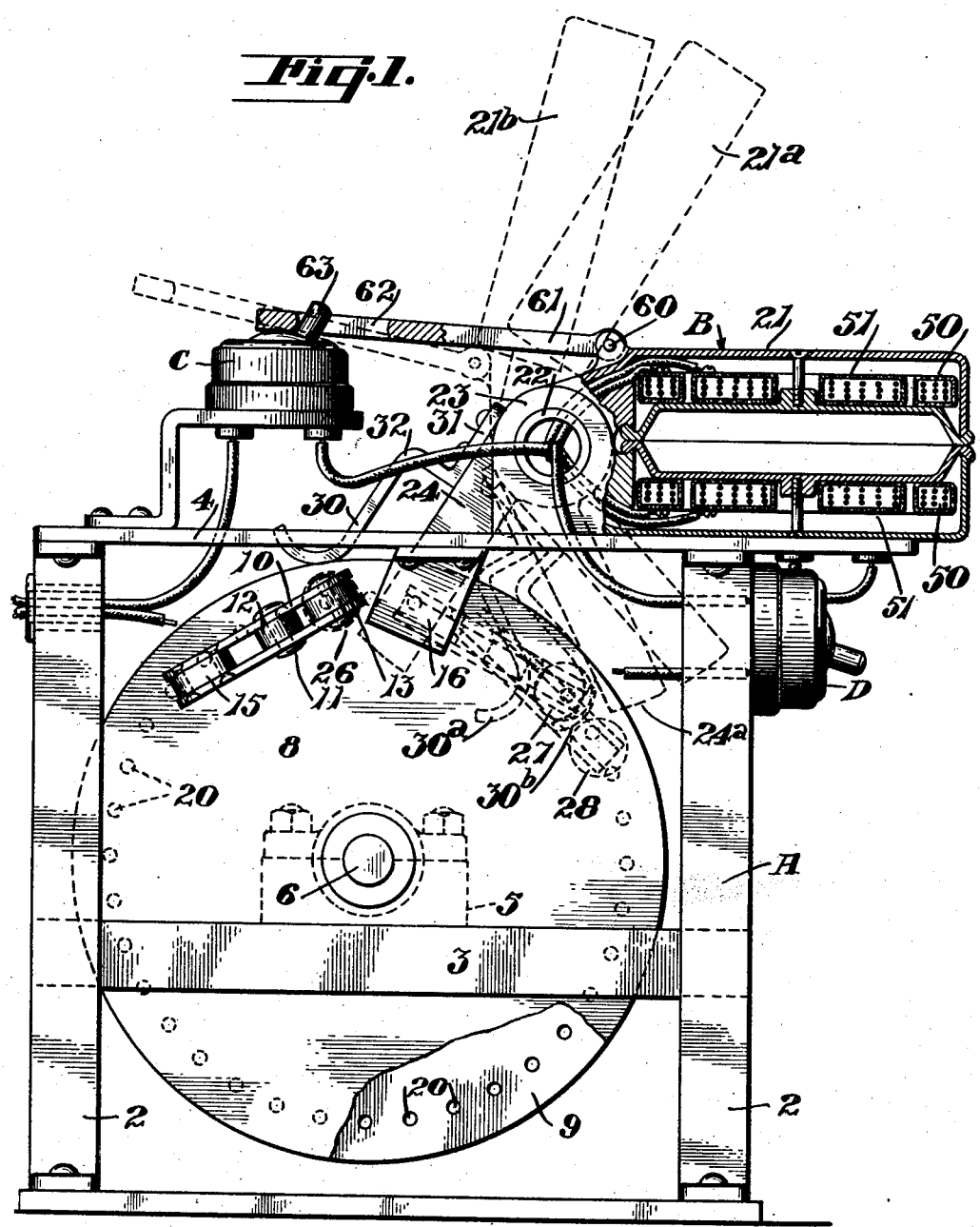
Fig. 1 is a side elevation of the machine partially in section.
Figure 3:
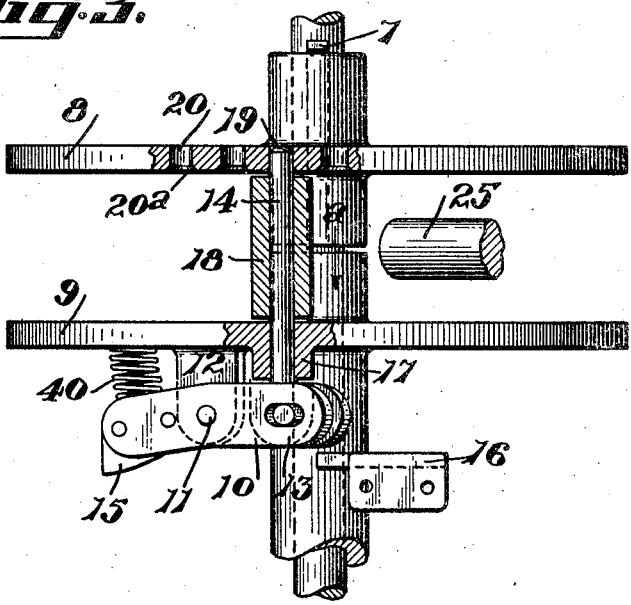
Fig. 3 is a plan view of the power-driven mechanism, whereby the cover of the cooking unit is automatically opened when the cooking operation is completed, said plan view being partially in section.

Referring to the drawings in detail, and particularly to Figs. 1 and 3, A indicates, in general, a frame constructed of angle iron or like material, this frame consisting of vertical legs 2, cross-braced as at 3, and which serve the purpose of supporting a table 4. Mounted upon the table is a cooking unit, generally indicated at B, which is electrically heated, as will hereinafter be described, and cooperating with said heating unit is a pair of electric switches, generally indicated at C and D. The switch indicated at C is automatically actuated, and the switch D is manually operated, as will hereinafter be described.

Supported by the cross-brace 3, in journal members such as indicated at 5, is a driving shaft 6; this shaft being continuously driven from an electric motor or other source of power supply not here shown. Keyed on the shaft, as indicated at 7, is a driving disk such as indicated at 8, and freely turnable on the shaft and supported thereby is a driven disk 9. Means are employed for automatically locking the driven disk 9 with relation to the driving disk 8 so as to drive the disks in unison one revolution, and means are also provided for automatically releasing the driven disk when one revolution has been completed. The means employed is perhaps best illustrated in Fig. 3. It consists of a latch arm 10 pivotally mounted on the exterior surface of the disk 9 as at 11; the pivotal mounting consisting of a lug 12 through which the pin 11 passes and about which the latch arm 10 rocks. One end of the latch arm is fork shaped to straddle the outer end 13 of a locking pin 14, while the other end of the latch is provided with a cam lug 15 which cooperates with a straight faced cam 16 supported on the under side of the table 4 and on one side of the latch arm 10. The locking pin 14 passes through a hub or bearing member 17 formed in the driven disk, and it also passes through a bushing 18 which is supported on the locking pin. The outer end of the locking pin is bevelled and rounded as indicated at 19, and it is adapted to form a driving engagement between the disks 8 and 9 by entering one or another of a series of equally spaced perforations 20 formed adjacent the periphery of the driving disk 8.

The locking pin 14 forms two functions, first, that of forming a driving connection between the disks 8 and 9, and secondly, that of an actuating member whereby a cover 21 on the cooking unit B is automatically opened when the cooking operation is completed.

The cover 21 is pivotally supported on a hollow shaft or pin 22, which is supported in bearing lugs 23, forming a part of the lower section of the cooking unit. The cover is also provided with a downwardly extending handle section 24, the lower end of which is disposed between the disks 8 and 9, as shown at 25 in Fig. 3.

To explain the opening operation of the cover 21, it is only necessary to state that the disks 8 and 9 rotate one revolution in unison, and that as the locking pin 14 and the bushing 18 travel around a circular path, the bushing 18 will engage the lower end of the arm 24 at the point indicated at 26. Continued rotation of the disks 8 and 9 will cause the locking pin and the bushing to travel to the dotted line position indicated at 27, (see Fig. 1) and the movement from the point indicated at 26 to the point indicated at 27 is utilized to raise the cover so that it will assume the dotted line position indicated at 21$^a$. The handle 24 will, during this period, move from the full line position indicated at 24 to the dotted line position indicated at 24$^a$. The driving connection between the disks 8 and 9 will here be broken and disk 9 will thus come to rest, while the driving disk 8 will continue rotating. The cover will, as a consequence, remain open and it will assume this open position until it is again desired to utilize the cooking unit. This is accomplished by closing the cover 21 so that it will assume the full line position indicated in Fig. 1. However, before closing it, it is obvious that the driven disk will have to be slightly advanced so as to move the locking pin 14 and the bushing carried thereby out of the path of the arm 24.* To manually advance the driven disk, the locking pin and the bushing carried thereby, it is necessary to further open the cover; that is, to swing it from the dotted line position indicated at 21$^a$ to the dotted line position indicated at 21$^b$. This movement is utilized to manually advance the driven disk 8 so that the locking pin and the bushing will move from the dotted line position indicated at 27 to the dotted line position indicated at 28. To obtain this manual advance, a cam arm 30 is employed. This cam is secured to the arm 24 at the point indicated at 31. It is slightly offset, as indicated at 32, and it terminates in a rounded cam shaped member such as indicated by the numeral 30. The cam arm swings or moves in unison with the arm 24, and it therefore normally assumes the full line position shown in Fig. 1 when the cover of the cooking unit is closed. It assumes the dotted line position indicated at 30$^a$ when the cover is open, and it assumes the second dotted line position indicated at 30$^b$ when the cover is manually operated or, in other words, from the dotted line position indicated at 21$^a$ to the dotted line position indicated at 21$^b$. It is, during this movement of the cover, that the cam member 30 performs its function, to-wit, that of advancing the driving disk and the locking pin 14, together with the bushing carried thereby, from the dotted line position indicated at 27 to the dotted line position indicated at 28.

By referring to Fig. 1, it will be seen that if the cover is manually moved from the first dotted line position to the second dotted line position, the cam member 30 will move from the dotted line position shown at 30$^a$ to the position shown at 30$^b$. The inner rounded surface of the cam will thus engage the bushing when it assumes the position shown at 27, and it will cause a partial rotation of the driving disk 9 by forcing the bushing from the position shown at 27 to that indicated at 28. This advance is sufficient to permit the lower end 25 of the arm 24 to clear the bushing, and the cover may thus be manually closed. The driving connection between the two disks is again automatically established, and the disk will thus again rotate in unison until a complete revolution has been substantially completed. When the bushing reaches the point indicated at 26, it will again engage the cover arm 24 and it will swing it from the full line position shown at 24 to the dotted line position shown at 24$^a$, thus opening the cover and, at the same time, automatically breaking the driving connection between the two disks; the cover, as previously stated, remaining open until it is again desired to use the cooking unit.

The driving connection between the disks is formed when the locking pin and the bushing reach the dotted line position indicated at 28, and the disks will then rotate in unison until the locking pin and the bushing reach the dotted line position shown at 27. The driving connection is here broken and the driving connection can only be made by manually advancing the locking pin and bushing, together with the disk 9, from the position shown at 27 to that indicated at 28. It may here be stated that the rotating movement of the disk 8 is fairly slow, and that the time required to make the revolution is sufficient to complete a cooking operation. The making and breaking of the driving connection between the two disks is accomplished as follows:

By referring to Fig. 3, it will be noted that as the disks 8 and 9 rotate in unison, cam lug 15 will engage the flat faced cam 16 and a rocking movement will thus be imparted to the latch arm 10. This rocking movement will pull the locking pin away from the disk 8 in the direction of arrow $a$, or, in other words, out of the perforation 20; the pin 14 being completely extracted when the pin and bushing carried thereby reach the dotted line position shown at 27. When the disk 9 is automatically advanced by means of the cam 30, as previously described, the locking pin and bushing will move from the position shown at 27 to that indicated at 28. The cam lug 15 will, during this movement, travel out of engagement with the flat faced cam 16 and the latch arm 10 will then automatically return to normal position, or, in other words, force the pin 14 into one of the perforations 20 of the driving disk, and it is in this manner that the driving connection is established. A helical spring 40 is interposed between the driven disk 9 and the cam lug 15 and this has sufficient tension to rock the latch arm about its pivot pin 11, and similarly to force the locking pin 14 into one of the perforations of the disk 8.

The bevelled end of the pin indicated at 19 is of considerable importance as it leads the pin into the perforations and, conversely, helps to force it out when the driving connection is broken; that is, the inner ends of the perforations or holes 20 are slightly bevelled as indicated at 20$^a$, and these bevelled portions, together with the angular and rounded end of the pin, produce the leading action desired.

Figure 2:
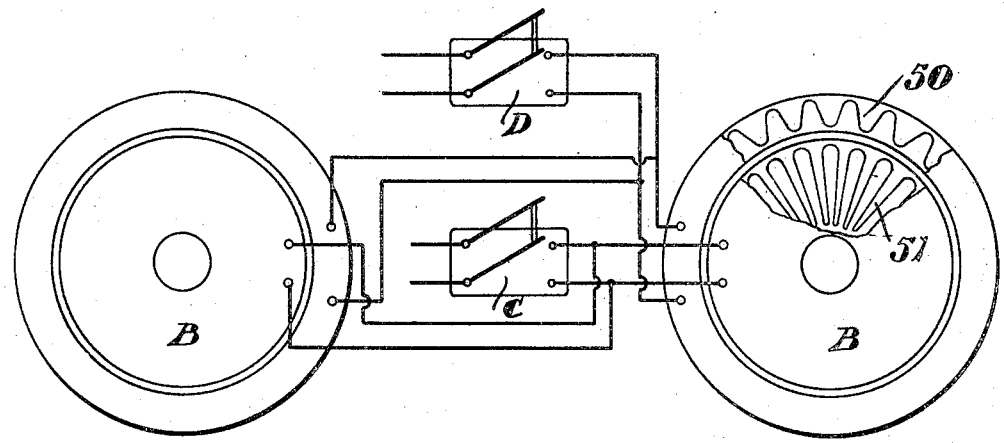
Fig. 2 is a wiring diagram showing the connection between the automatic and the manual control switches and the heating units.

For the purpose of illustrating one of the uses of the cooking unit, we will assume that it is employed for the purpose of making waffles. We will also assume that the machine is in a restaurant or hotel where the demand for waffles is intermittent, and it is therefore necessary, if quick service is required, to maintain the waffle iron at an operating temperature. With this object in view, I employ two electric heating units in the lower portion of the iron, and similarly two heating units in the cover portion of the iron. These heating units are annular or ring shaped as shown in Fig. 2; the unit indicated at 50 being termed the low heat unit, and the central unit indicated at 51 as the high heat unit. The current through the low heat units is controlled by the switch D, as shown diagrammatically in Fig. 2, while the circuit through the high heat units is automatically controlled by the switch C. This switch is automatically opened and the circuit broken when the cover is open, and the circuit remains broken until the cover is again closed. This is accomplished as follows:

Pivotally attached to the cover, as at 60, is a rearwardly projecting arm or link 61. The rear end of this link is slotted as shown at 62, and it straddles a switch lever 63. When the cover is opened to the position shown at 21$^a$, the switch lever 63 is engaged and swung from the full line position shown to the dotted line position, and the circuit is thus broken, but when the cover is manually closed, as previously described, the link is pulled forwardly and the rear end thereof will thus engage the switch lever and return it to On position. The circuit through the high heat units is thus automatically closed when the cover is closed, thus giving the desired temperature during the baking period, and the circuit is similarly automatically broken when the baking period is completed and the cover is opened. The circuit through the low heat units, however, remains on so as to maintain the waffle iron at a temperature where it is ready for instant use. The circuit through the low heat units is, however, controlled by the manually operated switch D, and it may thus be turned off in the morning or evening, or whenever desired.

From the foregoing description it can be seen that the driving shaft 6 will be continuously rotated when the machine is in operation, and that the circuit through the low heat units is established through means of the manually controlled switch D; these heating units being provided for the purpose of maintaining the waffle iron or cooking unit at a desired temperature or, in other words, at a temperature where it is ready for immediate use.

The cover 21 normally assumes an open position and if a call for waffles is received, it is only necessary to pour in the batter and to manually close the cover by swinging it from the dotted line position shown at 21$^a$ to the dotted line position shown at 21$^b$, and then by finally closing it. This operation, as previously stated, advances the disk 9 and, at the same time, automatically advances the latch arm 10, together with the locking pin and the bushing. This advance of the latch arm frees the cam lug with relation to the straight faced cam 16 and the driving connection is thus automatically established between the two disks. The disks will thus rotate in unison until one revolution has substantially been completed. During this revolution, the high heat units are in operation as the circuit was automatically established when the cover was closed, and as the timing of the disks is such that the baking operation will be completed when the revolution is completed, it can be seen that the cover will be automatically opened at the end of the baking period as the bushing 18 will engage the downwardly extending handle extension of the cover and thus force the same in a forward direction and thereby open the cover. When the cover assumes the dotted line position shown at 21$^a$, and the handle assumes the dotted line position shown at 24$^a$, the driving connection will be automatically broken as the cam lug 15 will then engage the straight faced cam 16, thereby rocking the latch arm to such an extent that pin 14 will be extracted. The driving disk will, however, continue to rotate and the driving connection will not be established until the disk 9 is manually advanced by the further raising of the cover, and then by the final closing of the same. In other words, the cover will remain open until the waffle iron is again required, and danger of burning or over-baking the waffles is thus entirely eliminated as the circuit through the high heat units is automatically broken when the cover is raised. In other words, the attendant may perform other duties after filling the iron with batter and closing the cover, as all danger of burning the waffles is eliminated by the automatic raising of the cover and the breaking of the high heat circuit.

It will be noted that the present drawings only illustrate one baking unit, but it is obvious that the table 4 may be made sufficiently long to receive a number of baking or cooking units. Similarly, that the driving shaft may be extended to support any number of driving and driven disks such as here illustrated. The invention is therefore not limited to a single cooking unit as any number of units desired may be placed in row formation on the table 4 and may, obviously, be operated from one common driving shaft such as shown at 6.

While certain features of the present invention are more or less specifically illustrated, I wish it understood that various changes in form and proportion may be resorted to within the scope of the appended claims. I similarly wish it understood that the materials and finish of the several parts employed may be such as the experience and judgment of the manufacturer may dictate or various uses may demand.

Having thus described my invention, what I claim and desire to secure by Letters Patent is—

1. A machine of the character described, comprising a support, an electrically heated cooking unit mounted thereon, a cover for the unit, said cover adapted to be manually closed and automatically opened after a predetermined time interval, means actuated by closing of the cover for closing an electric circuit in the cooking unit, and means actuated by opening of the cover for breaking said circuit.

2. A machine of the character described comprising a support, an electrically heated cooking unit mounted thereon, a cover for the unit, means actuated by closing of the cover for automatically closing an electric circuit in the cooking unit, and means for automatically opening the cover after a predetermined time period.

3. A machine of the character described comprising a support, an electrically heated cooking unit mounted thereon, a cover for the unit, means actuated by closing of the cover for automatically closing an electric circuit in the cooking unit, means for automatically opening the cover after a predetermined time period, and means actuated by said opening of the cover for breaking the circuit through the cooking unit.

4. A machine of the character described comprising a support, an electrically heated cooking unit mounted thereon, a cover for the unit, means actuated by closing of the cover for automatically closing an electric circuit in the cooking unit, means for automatically opening the cover after a predetermined time period, means actuated by said opening of the cover for breaking the circuit through the cooking unit, and other means for continuously maintaining the cooking unit at a predetermined temperature.

5. A machine of the character described comprising a support, a cooking unit comprising a base and a cover mounted thereon, a high and a low heat electric resistance element mounted in the cover and similarly in the base, means for normally maintaining a circuit through the low heat resistance elements, and means actuated by closing of the cover for automatically closing a circuit through the high heat elements in the cover and base, respectively.

6. A machine of the character described comprising a support, a cooking unit comprising a base and a cover mounted thereon, a high and a low heat electric resistance element mounted in the cover and similarly in the base, means for normally maintaining a circuit through the low heat resistance elements, means actuated by closing of the cover for automatically closing a circuit through the high heat elements in the cover and base, respectively, means for automatically opening the cover after a predetermined time interval, and means actuated by the opening movement of the cover for breaking the circuit through the high heat elements.

7. In a machine of the character described, a cooking unit, a cover pivotally mounted thereon, a continuously driven shaft, a disk freely supported, means actuated by closing movement of the cover, whereby a driving connection is formed between the shaft and the disk, means for automatically breaking the driving connection when one revolution has been completed, means actuated by said disk for opening the cover at the end of the revolution of the disk, a pair of heating elements in the cooking unit, means for maintaining a continuous circuit through one element to maintain the cooking unit at a predetermined temperature, and means actuated by closing of the cover for establishing a circuit through the second heating element, said means also breaking the circuit through the second element when the cover is opened.

8. A machine of the character described, comprising a support, an electrically heated cooking unit mounted thereon, a cover for the unit, said cover adapted to be manually closed and automatically opened after a predetermined time interval, means actuated by closing of the cover for closing an electric circuit in the cooking unit, means actuated by opening of the cover for breaking said circuit, a continuously driven shaft, a disk freely supported thereon, means actuated by closing movement of the cover, whereby a driving connection is formed between the shaft and the disk, means for automatically breaking the driving connection when one revolution has been completed, and means actuated by said disk for opening the cover at the end of the revolution of the disk.

9. A machine of the character described, comprising a support, an electrically heated cooking unit mounted thereon, a cover for the unit, said cover adapted to be manually closed and automatically opened after a predetermined time interval, means actuated by closing of the cover for closing an electric circuit in the cooking unit, means actuated by opening of the cover for breaking said circuit, a continuously driven shaft journalled in the support, a disk keyed to the shaft and rotatable in unison therewith, a second disk freely journalled on the shaft, means actuated by manual closing of the cover on the cooking unit for automatically establishing a driving connection between the first-named and the second-named disks, and means actuated by said disks whereby the cover is opened when the disks have made one revolution in unison.

10. A machine of the character described, comprising a support, an electrically heated cooking unit mounted thereon, a cover for the unit, said cover adapted to be manually closed and automatically opened after a predetermined time interval, means actuated by closing of the cover for closing an electric circuit in the cooking unit, means actuated by opening of the cover for breaking said circuit, a continuously driven shaft journalled in the support, a disk keyed to the shaft and rotatable in unison therewith, a second disk freely journalled on the shaft, means actuated by manual closing of the cover on the cooking unit for automatically establishing a driving connection between the first-named and the second-named disks, means actuated by said disks whereby the cover is opened when the disks have made one revolution in unison, and other means for breaking the driving connection between the first-named and last-named disks when one revolution has been completed.

HENRY A. CAMPBELL.